Figure 1:
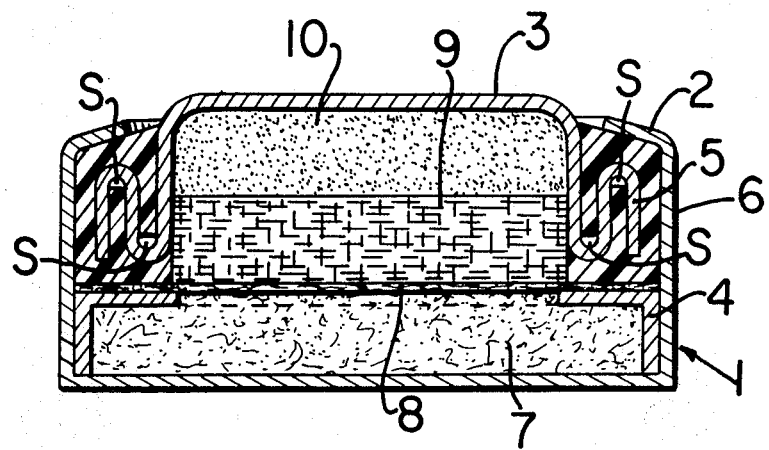

United States Patent

[11] 3,615,861

| [72] | Inventor | Michel Braem<br>Saint-Benoit, France |
|------|----------|--------------------------------------|
| [21] | Appl. No. | 21,049 |
| [22] | Filed | Mar. 19, 1970 |
| [45] | Patented | Oct. 26, 1971 |
| [73] | Assignee | Societe Des Accumulateurs Fixes Et De Traction (Societe Anonyme)<br>Romainville, France |
| [32] | Priority | Apr. 22, 1969 |
| [33] | | France |
| [31] | | 69/12687 |

[54] SEALING ARRANGEMENT FOR BUTTON-TYPE ELECTROCHEMICAL CELLS
6 Claims, 2 Drawing Figs.

[52] U.S. Cl. .................................................. 136/111,
136/133, 136/169
[51] Int. Cl. ................................................... H01m 21/00,
H01m 1/02
[50] Field of Search ........................................ 136/111,
107, 133, 163, 166, 169, 175, 83; 220/81, 67, 44

[56] References Cited
UNITED STATES PATENTS
2,378,446   6/1945   Soday ........................... 136/166 UX

| 3,015,410 | 1/1962 | Everett et al. ............... | 220/81 X |
| 3,015,681 | 1/1962 | Lone ............................ | 136/111 |
| 3,285,784 | 11/1966 | Babusci et al. ................ | 136/133 |
| 3,418,172 | 12/1968 | Fletcher ....................... | 136/111 |
| 3,457,117 | 7/1969 | Angelovich .................. | 136/133 |
| 3,524,568 | 8/1970 | Nughes ........................ | 220/67 |

*Primary Examiner*—Anthony Skapars
*Attorney*—Kenyon and Kenyon Reilly Carr & Chapin ABSTRACT: Arrangement for effectively sealing electromechanical cells of the so-called button-type embodying a pair of interfitting metal cups electrically insulated from each other by an annular gasket of molded insulating material, one of the cups constituting the cover having its rim portion folded upon itself at least twice in zigzag fashion or spiralwise surrounding which the said gasket is preferably molded in situ so that the material thereof penetrates at least partially spaces between the folds of the rim, leaving some free spaces at bottoms of the folds that serve as retention chambers for electrolyte inside the cell to preclude its leakage from the cells. The folds provide tortuous engaging surfaces with the gasket that enhance leakage prevention. The rim of the other cup is bent over the outer surface of the gasket to compress it sufficiently to provide at least one effective zone of elastic compression between surfaces of the first cup and gasket.

PATENTED OCT 26 1971 3,615,861

INVENTOR
MICHEL BRAEM
BY
Kenyon & Kenyon Reilly Carr & Chapin
ATTORNEYS

SEALING ARRANGEMENT FOR BUTTON-TYPE ELECTROCHEMICAL CELLS

RELATED APPLICATIONS

No related applications are copending.

BRIEF SUMMARY OF INVENTION

The invention relates to the cells of the so-called button type, and more especially to alkaline cells which comprise two metal cups fitting in each other while being electrically insulated from each other by an annular gasket made of organic polymer material, the first cup having its rim turned down upon the said gasket which surrounds the second cup, hereinafter called cover.

In such cells, the negative active material placed in one of the cups may comprise, e.g. zinc in the powder state, preferably amalgamated, and the positive active material placed in the other cup may be constituted by mercuric oxide, silver oxide or manganese dioxide, the electrolyte being an alkaline metal hydroxide such as potassium hydroxide.

An important problem in such cells is the sealing. It is well known that an electrolyte constituted by a potassium hydroxide solution which has strong wetting properties has a very strong tendency to creep along the metal surfaces, so that it becomes very difficult, if not impossible, to prevent first the creeping of this electrolyte along the inner surface of the cover, then its rounding the edge of the cover and lastly its progressing along the outer surface of the cover, which results in permitting the electrolyte to ooze out of the cell. This creeping becomes substantially more considerable when the metal surface on which it takes place is negatively polarized. This is why it is advantageous to provide supplementary sealing means along the negative surfaces.

In order to improve the sealing, it is already known to provide free spaces intended for constituting retention chambers for the electrolyte inside the cell. It has also been disclosed, more especially in the U.S. Pat. No. 2,877,285 of Mar. 10, 1959 to fold the cover rim upon itself and enclose this rim in the gasket, probably in order to improve the engagement between the gasket and the rolled rim of the cover.

However, all such known suggestions for improving the sealing of the cells have not given wholly satisfactory results.

An object of this invention is to provide a simple, effective and satisfactory solution. In order to obtain a practically leakproof seal three series of means are simultaneously put in practice so that they both cooperate and complement each other. Such means essentially comprises:

- lengthening the path for the creeping electrolyte between the contacting tortuous surfaces of the cover and the gasket,
- creating at least one zone of effective elastic compression between the surfaces of the gasket and the cover; and
- optionally providing retention chambers in the electrolyte path.

In effecting the objects of this invention, a cell of the so-called button type is provided, comprising two metal cups fitting in each other while being electrically insulated from each other by an annular gasket made of resilient organic polymer material, the first cup having its rim turned down upon an external face of the said gasket which latter surrounds the second cup hereinafter called cover, wherein the rim of the cover which has been folded upon itself at least twice lies embedded in the said gasket which has been preferably molded in situ about the folded rim of the cover so that it fills at least partially the space between the folds thus formed.

According to another characteristic of the invention, the cover rim may be folded either zigzagwise or spiralwise.

The embodiment with the cover rim zigzag folded constitutes the preferred embodiment since it is easier to make.

Advantageously the zinc active material is contained in the cover which is thus negatively polarized.

The gasket may leave free spaces at the bottoms of the rim folds, such spaces serving as retention chambers for the electrolyte.

Figure 2:
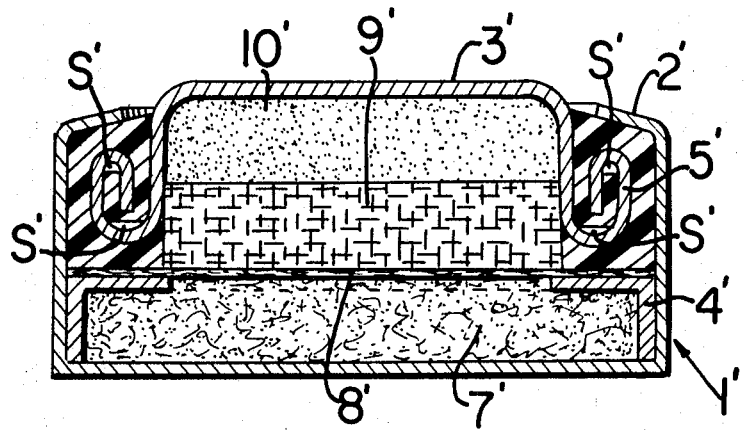

Other characteristics and features of the invention will be found in the following detailed description and in the annexed drawing in which:

FIG. 1 diagrammatically shows a much enlarged sectional view of a cell according to the invention; and FIG. 2 shows similarly an embodiment differing from that of FIG. 1.

In these FIGS., references 1 and 3 or 1' and 3' respectively correspond to a first metal cup, made of e.g. nickel-plated steel, and a cover. The covers 1 or 1' may be constituted by a brass sheet, copper plated on both faces, then nickel-plated on its outer face. They may also be constituted by a brass sheet, wholly silver plated, for instance, by an electrolytic process.

This may also be constituted by a copper sheet nickel-plated on its outer face, by a steel sheet copper-plated on both faces, then nickel-plated on its outer face, or by a wholly silver-plated steel sheet.

A thin layer of zinc may also advantageously be plated on the internal copper surfaces which may be in contact with zinc, since otherwise the zinc plating will spontaneously occur with a gas evolution which may be damaging.

An annular gasket 6 or 6' made of resilient organic polymer material, such as a polyamid, ensures the seal and insulation between the cups 1 and 3 or 1' and 3'.

The rim 2 of cup 1 or 2' of cup 1' is turned down over the said respective gasket 6 or 6'. According to the invention, the rim 5 of cover 3 is embedded in gasket 6 and twice folded upon itself therein, as is shown in FIG. 1.

The gasket 6 is preferably molded in situ over the folded rim 5 of the cover. Thus, the material constituting the gasket substantially fills the space inside the folds. However, the said material may advantageously leave free spaces S or S¹ in the bottoms of the folds, such spaces serving as retention chambers for the electrolyte. FIG. 2 is different from FIG. 1 in that in this figure the second fold of cover rim 5' is made inwards whereas in FIG. 1 the cover rim 5 is zigzagwise folded.

Gasket 6 or 6' is positioned over the outer or upper surface of an L-sectioned downwards turned metal ring 4 or 4' which rests upon the bottom of respective cup 1 or 1' by its respective skirt edge. The positive active material, which may be e.g. mercuric oxide or silver oxide is referenced 7 in FIG. 1 and 7' in FIG. 2. A barrier 8 or 8' made e.g. of regenerated cellulose is used respectively in FIGS. 1 and 2 for preventing the diffusion of reduced mercury towards the anode compartment. This barrier bears a suitable separator 9 or 9'. The negative active material 10 or 10' in the respective cells of FIGS. 1 and 2 may be made of amalgamated powder zinc. The bottoms of the covers 3 or 3' in contact with the active material 10 or 10' may be tin plated.

The configuration of the twice-folded, preferably zigzagwise cover rim 5 or spirally folded cover rim 5' plays a special part in the efficiency of the seal. The turning down process of portions 2 or 2' of cups 1 or 1' on the surfaces of gaskets 6 or 6' puts the respective gasket 6 or 6' under pressure, by first compressing the corresponding outer parts of the respective gasket. This pressure is transmitted to the outer fold of the cover rims 5 or 5' but since these rims are twice folded either zigzag or spiral they possess a greater resilience. The pressure is transmitted, though a little decreased, first to the first fold enclosing gasket material, then to the second fold also enclosing gasket material. This gradation of the pressure along the successive gasket-cover surfaces results in ensuring at least one gasket-metal contact surface with an elastic pressure, even supposing that the gasket 6 or 6' is slightly crushed at its outer parts.

It is well understood that the invention is in no way limited to the described and shown embodiments, which have been given only as examples. More especially, without departing from the scope of the invention, details may be changed, some dispositions may be modified and some means may be replaced by equivalent means.

What is claimed is:

1. A cell of the button-type containing electrolyte and comprising two metal-interfitting cups, an annular gasket of resilient organic polymer material electrically insulating said cups from each other, a first of said cups having its rim turned down and pressed upon said gasket to compress it, said gasket surrounding the second of said cups, the rim of said second cup being folded upon itself at least twice and being embedded in said gasket, the latter being positioned around the folded rim of said second cup so that it fills at least partially spaces between the folds of the rim of said second cup, the folds of said rim of said second cup providing tortuous surfaces engaging the gaskets to prevent leakage of electrolyte from the cell.

2. A cell according to claim 1, wherein said gasket leaves fill spaces at the bottoms of said folds, such spaces serving as retention chambers for electrolyte in said cell.

3. A cell according to claim 1, wherein said rim of said second cup is folded zigzagwise.

4. A cell according to claim 1, wherein said rim of said second cup is folded spiralwise.

5. A cell according to claim 1, wherein said gasket is molded in situ around the folded rim of said second cup.

6. A cell according to claim 1, including an L-sectioned downwardly turned metal ring mounted in said first cup with its skirt portion resting on the bottom of said first cup, positive active material within the space defined by the bottom of said first cup and the inner faces of said L-sectioned ring, separator means overlying the upper face of said ring and negative active material in the space defined between the inner face of the bottom of said second cup and said separator means.

* * * * *

PO-1050
(5/69)

UNITED STATES PATENT OFFICE
CERTIFICATE OF CORRECTION

Patent No. 3,615,861      Dated October 26, 1971

Inventor(s) Michel Braem

It is certified that error appears in the above-identified patent and that said Letters Patent are hereby corrected as shown below:

Column 2 in the Abstract, second line, "electromechanical" should read ---electrochemical---.

Column 2, line 14, "This" should read ---They---.

Signed and sealed this 28th day of March 1972.

(SEAL)
Attest:

EDWARD M. FLETCHER, JR.　　　　　ROBERT GOTTSCHALK
Attesting Officer　　　　　　　　　Commissioner of Patents